United States Patent
Ma et al.

(10) Patent No.: US 7,778,338 B2
(45) Date of Patent: Aug. 17, 2010

(54) METHOD AND APPARATUS FOR ESTIMATING TIMING ERROR AND FREQUENCY OFFSET OF MIMO SYSTEM

(75) Inventors: Zhang-Yong Ma, Daejeon (KR); Young-Il Kim, Daejeon (KR)

(73) Assignees: Samsung Electronics Co., Ltd. (KR); Electronics and Telecommunications Research Institute (KR); KT Corporation (KR); SK Telecom Co., Ltd. (KR); Hanaro Telecom, Inc. (KR)

( * ) Notice: Subject to any disclaimer, the term of this patent is extended or adjusted under 35 U.S.C. 154(b) by 802 days.

(21) Appl. No.: 11/636,799

(22) Filed: Dec. 11, 2006

(65) Prior Publication Data

US 2007/0183518 A1    Aug. 9, 2007

(30) Foreign Application Priority Data

Dec. 10, 2005   (KR) ...................... 10-2005-0121361

(51) Int. Cl.
*H04K 1/10* (2006.01)
*H04L 27/28* (2006.01)

(52) U.S. Cl. ...................... 375/260; 375/148; 375/229; 375/350

(58) Field of Classification Search ................. 375/146, 375/148, 260, 267, 299, 326, 355; 370/203, 370/206, 208, 210, 503
See application file for complete search history.

(56) References Cited

U.S. PATENT DOCUMENTS

| | | | |
|---|---|---|---|
| 6,633,616 B2* | 10/2003 | Crawford | 375/326 |
| 7,088,782 B2* | 8/2006 | Mody et al. | 375/260 |
| 2006/0209927 A1* | 9/2006 | Khandekar et al. | 375/146 |
| 2006/0209979 A1* | 9/2006 | Sandell et al. | 375/267 |

* cited by examiner

*Primary Examiner*—David C Payne
*Assistant Examiner*—Syed Haider
(74) *Attorney, Agent, or Firm*—The Farrell Law Firm, LLP (57) ABSTRACT

The present invention relates to a method and device for estimating a timing error and a frequency offset in the MIMO mobile communication system. In a system including a plurality of transmit antennas and a plurality of receive antennas, a predetermined preamble symbol is inserted into a frame to be transmitted by a transmitting device, and pseudo noise is multiplied to the preamble symbol, and result signal is transmitted through each transmit antenna. A receiving device receives the signal through each receive antenna, extracts a preamble symbol from the OFDM symbol, and multiplies local pseudo noise that corresponds to the pseudo noise used by the transmitting device and is shifted by the extracted preamble symbol. A timing error is estimated and compensated according to the correlation of the pseudo noise of the transmitting device and the local pseudo noise of the receiving device. A frequency offset is estimated and compensated according to the phase difference between the preamble symbols. Therefore, the system is realized in a simpler manner and timing error and frequency offset estimation and compensation performance is further improved.

10 Claims, 11 Drawing Sheets

| Items | Values |
|---|---|
| Carrier frequency | 2300~2400MHz |
| Bandwidth | 10MHz |
| Duplexing method | TDD |
| Access type | OFDM/TDMA |
| Modulation method | QPSK,16QAM,64QAM |
| Number of used subcarriers | 864 out of 1024 |
| Number of traffic subscrriers | 768 |
| CP | 1/8(128) |
| Sampling frequency | 10MHz |
| Subcarrier interval | 9.76525KHz |

| SNR(dB) | Probability for AWGN $\hat{\theta}$ | Probability for multipath $\hat{\theta}$ |
|---|---|---|
| 0 | 99.9% | 99.86% |
| 2 | 99.95% | 99.90% |
| 4 | 100% | 100% |
| 6 | 100% | 100% |
| 8 | 100% | 100% |

$\hat{\theta}$ Probability

METHOD AND APPARATUS FOR ESTIMATING TIMING ERROR AND FREQUENCY OFFSET OF MIMO SYSTEM

PRIORITY

This application claims priority under 35 U.S.C. §119 to a Korean application filed in the Korean Intellectual Property office on Dec. 10, 2005 and allocated Serial No. 10-2005-0121361, the contents of which are incorporated herein by reference.

BACKGROUND OF THE INVENTION (a) Field of the Invention

The present invention relates to a mobile communication system, and in particular, it relates to a method and device for estimating a timing error and a frequency offset in a mobile communication system.

(b) Description of the Related Art

As the services such as the real-time Internet and VoIP have been provided according to users' various requests, techniques for supporting high data rates have been developed. The OFDM (the Orthogonal Frequency Division Modulation) highlighted as the most useful technique among the next generation mobile communication techniques has been adopted as the wireless LAN standards and European digital audio and video broadcasting standards.

A major method for realizing high data rates is to improve link process throughputs and network capacity. A method for improving the throughput is the MIMO (multiple-input multiple-output) technique, in which a plurality of antennas is installed in a transmitter and a receiver, the transmitter transmits data to the receiver through multipaths, the receiver receives and detects signals transmitted through the respective path, and thus, the throughput is substantially increased because of the antennas. The MIMO technique is basically divided into two groups, that is, the STC (space time coding) and the SDM (space division multiplexing).

To satisfy the requirement for high data rates, the OFDM-MIMO system provided by combining the OFDM and the MIMO has been used. To improve the OFDM-MIMO system performance, time and frequency synchronization is required. A frequency offset is generated because of mismatching between oscillators of the transmitter and the receiver and the Doppler effect, and the frequency offset changes the phase of received signals to thus deteriorate decoding performance of the receiver. Particularly, in the multi-carrier using OFDM, the symbol is detected for each subchannel, and hence, when a frequency offset is generated, the orthogonality between the subcarrier frequencies is not maintained so that interference between adjacent subchannels is generated. The interference is called ICI (inter-carrier-interference). Also, a timing offset is generated, which disturbs orthogonality between the received subcarriers.

Accordingly, various techniques for estimating and eliminating the frequency offset and the timing offset generated by the receiver have been proposed. Conventional techniques generally use the DA (data-aided) algorithms having synchronization information and the NDA (non data-aided) feed-forward estimation structures having statistics of received signals.

The signals received by the receiver are influenced by ISI because of a multipath channel before undergoing a FFT process. However, the prior arts fail to estimate accurate timing errors and frequency offsets since they do not consider the ISI effects.

SUMMARY OF THE INVENTION

The present invention has been made in an effort to accurately estimate timing errors and frequency offsets in a mobile communication system.

The present invention has been made in another effort to provide a device and method for efficiently achieving time-frequency synchronization by estimating timing errors and frequency offsets with a simpler structure in an OFDM MIMO system.

In one aspect of the present invention, a method for estimating a timing error and a frequency offset based on a received signal in an OFDM MIMO system includes: a) processing signals received through a plurality of antennas to generate OFDM symbols, and extracting a preamble symbol from the OFDM symbol wherein a PN sequence is multiplied to the preamble symbol of the OFDM symbol and the OFDM symbol and the PN sequence are multiplied with each other after a predetermined delay at a transmitting side; b) multiplying the extracted preamble symbol by a local PN sequence delayed for a predetermined value wherein the local PN sequence corresponds to the PN sequence; c) estimating a timing error based on the amplitude of a corresponding signal that is generated by multiplying the extracted preamble symbol by the local PN sequence, and compensating the timing error; and d) estimating a frequency offset based on the preamble symbol to which the local PN sequence is multiplied, and compensating the frequency offset.

In another aspect of the present invention, a device for estimating a timing error and a frequency offset based on a received signal in an OFDM MIMO system for transmitting and receiving the signal through a plurality of transmit antennas and a plurality of receive antennas includes: a plurality of preamble extractors, formed to correspond to a receive antenna, for extracting a preamble symbol from an OFDM symbol for the signal received through the corresponding receive antenna wherein a PN sequence delayed by a predetermined value is multiplied to the preamble symbol of the OFDM symbols of the signals received through a first antenna from among receive antennas; a local PN generator for generating a local PN sequence that corresponds to the PN sequence and is shifted by a predetermined value; a multiplier, formed to correspond to a preamble extractor, for delaying the local PN sequence by a predetermined value and transmitting the delayed local PN sequence to the extracted preamble symbol; a timing error estimator and compensator for estimating and compensating a timing error based on the correlation of the PN sequence of the preamble symbol and the local PN sequence; and a frequency offset estimator and compensator for estimating and compensating a frequency offset based on the preamble symbol to which the local PN sequence is multiplied.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Accordingly, the drawings and description are to be regarded as illustrative in nature and not restrictive.

Throughout this specification and the claims which follow, unless explicitly described to the contrary, the word "comprising" or variations such as "comprises" will be understood to imply the inclusion of stated elements but not the exclusion of any other elements.

A method for estimating a timing error and a frequency offset according to an embodiment of the present invention will now be described.

In the OFDM-MIMO system having a plurality of transmit antennas and receive antennas, a transmitting device includes transmitters corresponding to respective transmit antennas, and a receiving device includes receivers corresponding to respective receive antennas.

In the system, a signal that is modulated in the frequency domain and is then transmitted through the n-th antenna is defined as $S_n^k = [S_n^k(0), S_n^k(1), \ldots, S_n^k(N_c-1)]^T$. Here, $S_n^k()$ is k-th transmitted OFDM symbol, and $N_c$ is the number of subcarriers in a symbol.

To equalize the channel while maintaining the orthogonality, a cyclic prefix (CP) is added to a signal to be transmitted, and the CP in this case has a length of $N_g$ greater than the maximum multipath spread. When the signal to be transmitted is IFFT performed and a CP is added thereto, a time-domain transmit signal is generated as expressed in Equation 1.

$$X^k = \begin{bmatrix} x^k(0) & \cdots & \cdots & \cdots & x^k(N_0+L-2) \\ x^k(-1) & \ddots & & & x^k(N_0+L-3) \\ \vdots & & \ddots & & \vdots \\ x^k(-L+1) & \cdots & \cdots & x^k(0) & \cdots & x^k(N_0+1) \end{bmatrix} \quad \text{(Equation 1)}$$

where $$x^k(i) = [e^{j2\pi\epsilon i/N} x_0^k(i) e^{j2\pi\epsilon i/N} x_1^k(i) \ldots e^{j2\pi\epsilon i/N} x_{N_t-1}^k(i)], \text{ and}$$

$$x_n^k(i) = \sum_{t=0}^{N_c-1} S_n^k(t) e^{j2\pi it/N}.$$

$N_0 = N_c + N_g$ is a length of the CP satisfying the necessary condition of $N_g \geq L$. L is the maximum number of delayed samples.

The transmitting device and the receiving device use the same oscillator for synchronization, and the frequency offsets $\epsilon$ between each of the transmit antennas and each of the receive antennas are the same. The symbols transmitted through the transmit antennas $N_t$ are received by the receive antennas $N_r$.

Assuming that the number of paths for a fading channel between the transmit antenna and the receive antenna is given as L and the fading channel between the i-th transmit antenna and the j-th receive antenna is independent, $h_l^k$ is defined to be an $N_r \times N_t$ MIMO channel matrix related to the time delay $l=0, 1, \ldots, L-1$, as given in Equation 2.

$$h_l^k(n) = \quad \text{(Equation 2)}$$

$$\begin{bmatrix} A_{00}^{lk}\delta(n-\tau_{00}-l) & A_{01}^{lk}\delta(n-\tau_{01}-l) & \cdots & A_{0(N_t-1)}^{lk}\delta(n-\tau_{0(N_t-1)}-l) \\ A_{10}^{lk}\delta(n-\tau_{10}-l) & A_{11}^{lk}\delta(n-\tau_{11}-l) & \cdots & A_{1(N_t-1)}^{lk}\delta(n-\tau_{1(N_t-1)}-l) \\ \vdots & \vdots & \ddots & \vdots \\ A_{(N_r-1)0}^{lk}\delta(n-\tau_{(N_r-1)0}-l) & A_{(N_r-1)1}^{lk}\delta(n-\tau_{(N_r-1)1}-l) & \cdots & A_{(N_r-1)(N_t-1)}^{lk}\delta(n-\tau_{(N_r-1)(N_t-1)}-l) \end{bmatrix}$$

where $\tau_{ij}$ is a timing error between the i-th transmit antenna and the j-th receive antenna, and $A_{ij}^{lk}$ is radio channel amplitude.

In general, a preamble symbol in the OFDM frame is used to acquire synchronization information and a channel parameter. For unique identification for synchronization in the OFDM MIMO system, preambles at different transmit antennas are orthogonal and shift-orthogonal. For the system with very high data rates (e.g., over 100 Mbps) in the future wireless communication, the timing error caused by the radio channel is not to be ignored but to be considered during designation of a preamble. The preamble symbols proposed by the respective frames of the transmit antennas are expressed in Equation 3. Positive known subcarriers at the n-th antenna are multiplexed with data at the pilot ratio of 1/K. A frequency-domain subcarrier can be expressed as given in Equation 3.

$$P_l[k] = \begin{cases} A, & k = Km \\ 0, & k = km + i \end{cases} \quad \text{(Equation 3)}$$

where, K, m and i are integers satisfying $1 \leq i \leq K-1$ and $0 \leq m \leq M-1$, A is pilot amplitude, and M=N/K is an integer. The n-th time-domain pilot sample is expressed in Equation 4.

$$p^0(l) = IFFT\{P_n^k(l)\} = \frac{1}{N}\sum_{i=0}^{N_c-1} P_n^k(i)e^{j2\pi l i/N_c} = \frac{A}{K}\sum_{r=0}^{K-1}\delta(l-Mr) \quad \text{(Equation 4)}$$

In the n-th transmitter, the Dn sample related to the $0^{th}$ transmitter preamble symbol $p^0$ is shifted. In each transmitter, D is selected while maintaining the preamble symbol orthogonality, and the selected D satisfies $L \leq D \leq M/N_t$. Therefore, the preamble symbol to be transmitted through the n-th antenna is given in Equation 5.

$$p_n^0(l) = \begin{cases} A/K, & l = Mm + nD \\ 0, & l = Mm + n \end{cases} \{0 \leq n \leq M-1 \cap n \neq nD\} \quad \text{(Equation 5)}$$

Where $0 \leq m \leq K-1$. In this instance, the shifted 0 is eliminated so as to maintain the length of the preamble symbol.

In the condition in which the length $N_{cp}$ of CP is M times after the addition of CP, the non-zero subcarrier in the preamble symbol of each transmitter is $G=(K+N_{cp}/M)$.

The CP is added to the former part of a signal by reproducing predetermined part of valid data interval, representing residual signals that are not used for demodulation. On the receiving side, an FFT is used to demodulate the signal, and valid data except the CP are used for the inputs to the FFT. In this instance, an FFT window is used to eliminate the CP. Timing synchronization is corrected in the time domain since the FFT window is influenced by a timing error in the demodulation.

Because of the multipath channel, the time domain signal is influenced by the multipath channel and the ICI caused by the oscillator. Therefore, performance of an estimating device for estimating a timing error and a frequency error is influenced by the ICI.

In embodiment of the present invention, the error is estimated by using the PN (pseudo noise) based algorithm so that the effect caused by the ICI may be partially or totally eliminated.

A complex PN sequence is expressed as $C^0 = [C_0, C_1, \ldots, C_{G-1}]$ where $C_1 = [c_i, 0, \ldots, 0]$ is an M×1 matrix. It is assumed that the power of PN is 1, that is, it is given that $c_i \in \{\pm 1/\sqrt{2} + j(\pm 1/\sqrt{2})\}$ and T is a conjugate of the matrix.

The pilot preamble for the antenna $(N_t-1)$ is shifted with a sample D. That is, D*n zeros are added to the preamble symbol of the first transmit antenna, and hence, the PN sequence added to the preamble symbol at the n-th transmit antenna is expressed as Equation 6.

$$C^n = [0, \ldots, 0, C_0, C_1, \ldots, C_{G-1}] \quad \text{(Equation 6)}$$

The preamble symbol is multiplied with the PN sequence, and the signal transmitted through the n-th transmit antenna is given in Equation 7.

$$pre_n^0(l) = \quad \text{(Equation 7)}$$
$$\begin{cases} c_m A/K, & l = Mm + nD \\ 0, & l = Mm + n' \end{cases}, \{0 \leq n' \leq M-1 \cap n' \neq nD\}$$

The signal transmitted through a transmit antenna of the transmitting device is received by a predetermined receive antenna of the receiving apparatus, and the received signal is expressed in Equation 8.

$$y_n^0(t) = \sum_{l=0}^{L-1}\sum_{j=0}^{N_t-1} A_{nj}^{l0} \frac{A}{K} C_n(t - l - \tau_{nj}) + n_n^k(t) \quad \text{(Equation 8)}$$

where $y_n^k(t)$ is the t-th subcarrier in the k-th symbol of the antenna having received the signal from the n-th transmit antenna, and $n_n^k(t)$ is white Gaussian noise generated by adding the average 0 and the variance $\sigma^2$.

When the respective receivers corresponding to the receive antennas of the receiving device estimate the timing error, a local PN sequence (a duplicate of the PN sequence of the corresponding transmitter) is shifted to be provided to the corresponding preamble symbol, which is given in Equation 9.

$$\lambda_{ij}(i) = \frac{A}{K}\sum_{i=0}^{G-1} c^*_{(t-k)} y_n^0(t - \tau_{ij}) k = 0, \pm 1, \pm 2, \ldots \quad \text{(Equation 9)}$$

where * is a conjugate complex, and $\lambda_{ij}(i)$ is amplitude of the signal transmitted and received between the i-th transmit antenna and the j-th antenna.

The correlation is one of important characteristics of the PN sequence, and the autocorrelation is very big. Equation 10 expresses the autocorrelation of the PN sequence.

$$R_c(k) = \sum_{i=1}^{G} c(t)c^*(t+k) = \begin{cases} G & k = 0 \\ -1 & k \neq 0 \end{cases} \quad \text{[equation 10]}$$

Based on the characteristic, the timing error between the i-th receive antenna and the j-th transmit antenna is estimated according to Equation 9, and the estimated timing error is the maximum value of the signal of the amplitude $\lambda_{ij}(i)$, which is then expressed in Equation 11.

$$\tau_{ij} = \max|\lambda_{ij}(i)| \quad \text{[equation 11]}$$

The frequency offset is estimated after estimating the timing error. The preamble signal compensated by the estimated timing error and the frequency offset is expressed as $\eta_{ij}(t) = c^*(t)y_{ij}^0(t)$.

When the SNR is large, the estimated frequency offset $\hat{\epsilon}_{ij}$ is given in Equation 12.

$$\hat{\epsilon}_{ij} = \frac{1}{G-m} \sum_{l=0}^{K-m-1} \frac{N_s}{2\pi nM} \arctan(\eta_{ij}(l)\eta_{ij}^*(l+m)) \quad \text{[equation 12]}$$

where m is selected according to different channel conditions. The best performance is acquired by a frequency estimating device when m=2G/3 in Equation 10. However, m is very small for the radio channel. In the embodiment of the present invention, 1 is selected for m, and without being restricted to this, the range of the estimated frequency offset is given as Equation 13.

$$|\hat{\epsilon}_{ij}| \leq \frac{N_s}{2M} \quad \text{[equation 13]}$$

Since the same frequency offset is generated as the same oscillator is used by the transmitting device and the receiving device, the estimated frequency offset is averaged as expressed in Equation 14.

$$\hat{\epsilon} = \frac{1}{N_t N_r} \sum_{i=0}^{N_r-1} \sum_{j=0}^{N_r-1} \hat{\epsilon}_{ij} \quad \text{[equation 14]}$$

When G is large in Equation 10, $\lambda_{ij}(i)$ is regarded as a complex Gaussian random variable. In general, the timing error is small (G>>θ). When the estimated timing error is true (i=θ), the average of $\lambda_{ij}(i)$ is given in Equation 15.

$$\xi_{ij} = E[\lambda_{ij}(i)] \quad \text{[equation 15]}$$

$$\approx \frac{A}{K} \sum_{o=0}^{G-1} \hat{c}_0 c_0 e^{j2\pi M\epsilon_{ij}/N_s}$$

$$= \begin{cases} \frac{AG}{K} \cdot \frac{\sin(\pi GM\epsilon_{ij}/N_s)}{\sin(\pi M\epsilon_{ij}/N_s)}, & \epsilon \neq 0 \\ \frac{AG}{K}, & \epsilon = 0 \end{cases}$$

Therefore, the variance is acquired according to Equation 16.

$$\sigma^2 = \frac{1}{G} \sum_{s=0}^{G-1} E\left[|\hat{c}_n(t)y_n^0(t) - E(\hat{c}_n(t)y_n^0(t))|^2\right] \quad \text{[equation 16]}$$

$$= \frac{1}{G} \sum_{i=0}^{G-1} E\left[\left|\hat{c}_n(t)y_n^0(t) - \frac{A}{K}e^{j2\pi\epsilon_0 t/N_s}\right|^2\right]$$

$$= \sigma_n^2$$

where $\sigma_n^2$ is the variance of the added Gaussian white noise. When the estimate cannot accurately estimate the timing error, the average of the frequency offset $\epsilon_{ij}$ is 0. When the estimating device estimates the timing error based on Equation 16, the average of $\lambda_{ij}(i)$ is very large compared to 0. Therefore, wrong determination is very less probable, and accurate determination is very much probable. The probability of accurate determination is given in Equation 17.

$$F_{|\lambda_0(0)|} \approx 1 - Q\left(\frac{x - \epsilon_{ij}}{\sigma}\right) \quad \text{[equation 17]}$$

where $$Q(x) = \frac{1}{\sqrt{2\pi}} \int_x^\infty e^{-t^2/2} dt$$

All data are influenced by former part of data because of the ICI in the received signal $y_n^0(t)$. According to the algorithm in the embodiment of the present invention, the (M−1) data are zeros in the former part of non-zero data. Assuming it is given that U≦M−1, U is determined by the maximum delay $\tau_{max}$ of the multipath channel and the symbol rate Rsps (U≈⌈τR⌉). Therefore, the ICI is eliminated, and performance of the frequency estimating device is further improved.

A device for transmitting and receiving signals based on the timing error and frequency offset estimating method will now be described.

The mobile communication system according to the embodiment of the present invention is an OFDM MIMO system having K subcarriers, and includes a transmitting device 100 having a plurality of transmit antennas and a receiving device 200 having a plurality of receive antennas.

Figure 1:
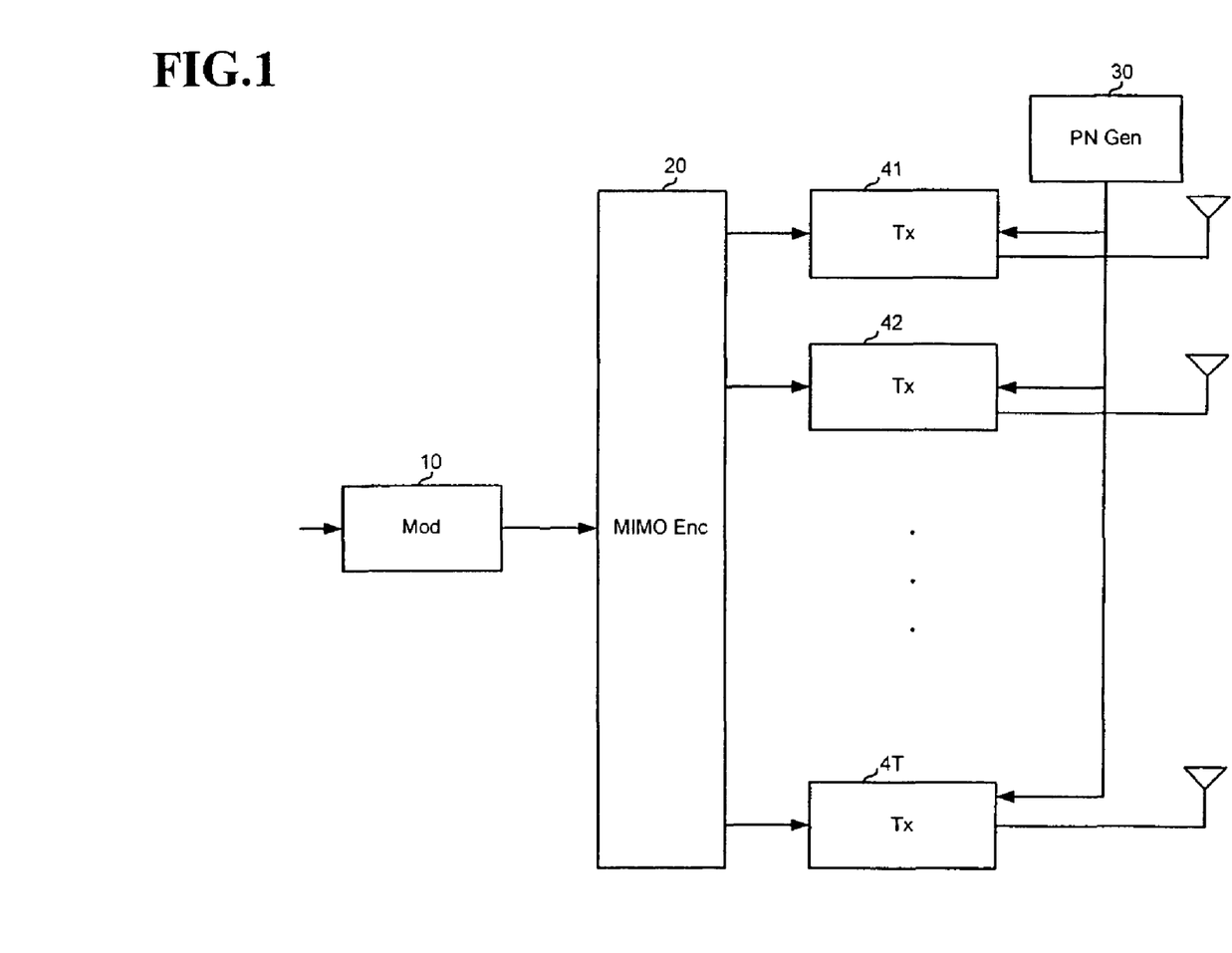
FIG. 1 shows a schematic diagram for a transmitting device of an OFDM MIMO according to an embodiment of the present invention.
Figure 2:
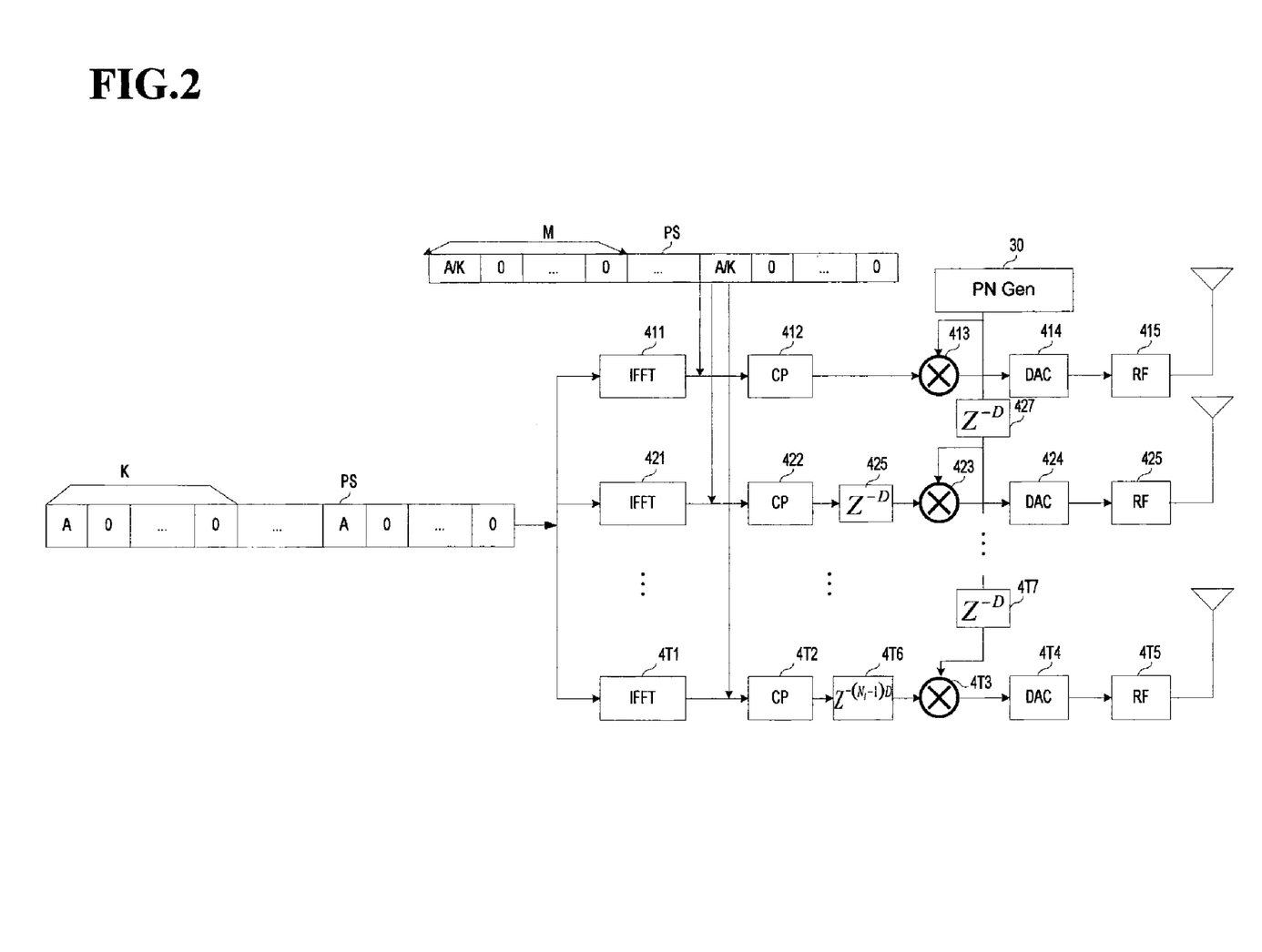
FIG. 2 shows a detailed schematic diagram for the transmitting device shown in FIG. 1.

FIG. 1 shows a schematic diagram for a transmitting device in a mobile communication system according to an embodiment of the present invention, and FIG. 2 shows a detailed structure and processing example for the transmitting device shown in FIG. 1.

As shown in FIG. 1 and FIG. 2, the transmitting device 100 includes a modulator 10, an encoder 20, and a PN generator 30, and it further includes IFFT units (411, 421-4T1, where T is an integer), CP adders (412, 422-4T2), multipliers (413, 423-4T3), signal converters (DAC, 414, 424-4T4) and radio frequency processors (RF, 415, 525-4T5) respectively as many as the number of transmit antennas.

The signal modulator 10 modulates bits of data to be transmitted into symbols according to a predetermined modulation method, for example, it modulates the data according to the modulation method such as the 64 QAM, 16 QAM, and QPSK, and outputs symbols.

The encoder 20 encodes the symbols output by the signal modulator, for example, the encoder 20 encodes the symbols based on the space-time ST processing or space division multiple access SDMA. The encoded symbols are processed by the IFFT units (411, 421-4T1) and are output as OFDM symbols, and the CP adders (412, 422-4T2) insert a CP into predetermined intervals of the OFDM symbols.

The PN generator 30 generates a PN (Pseudo Noise) sequence, and the multipliers (413, 423-4T3) multiply the preamble symbol of the CP inserted OFDM symbols by the PN sequence. The signal converters (414,424-4T4) convert digital signals into analog signals, and the radio frequency processors (415, 425-4T5) convert the analog baseband transmission signals into radio frequency signals and transmit the RF signals to the antenna.

As shown in FIG. 1 and FIG. 2, a unit including each one of the IFFTs (411, 421-4T1), CP adders (412, 422-4T2), multipliers (413, 423-4T3), signal converters (414, 424-4T4), and radio frequency processors (415, 425-4T5) will be referred to as a transmitter, for ease of description. Therefore, the transmitting device 100 includes a plurality of transmitters (41-4T) as many as the number of transmit antennas, as shown in FIG. 1.

As shown in FIG. 2, in the transmitting device 100, the transmitters (42-4T) other than the transmitter 41 connected to the first antenna further include first delay units (426-4T6) connected to output terminals of the CP adders (422-4T2) and delaying applied OFDM symbols, and second delay units (427-4T7) delaying the PN sequence applied by the PN generator 30.

A configuration of the receiving device according to an embodiment of the present invention will be described.

Figure 3:
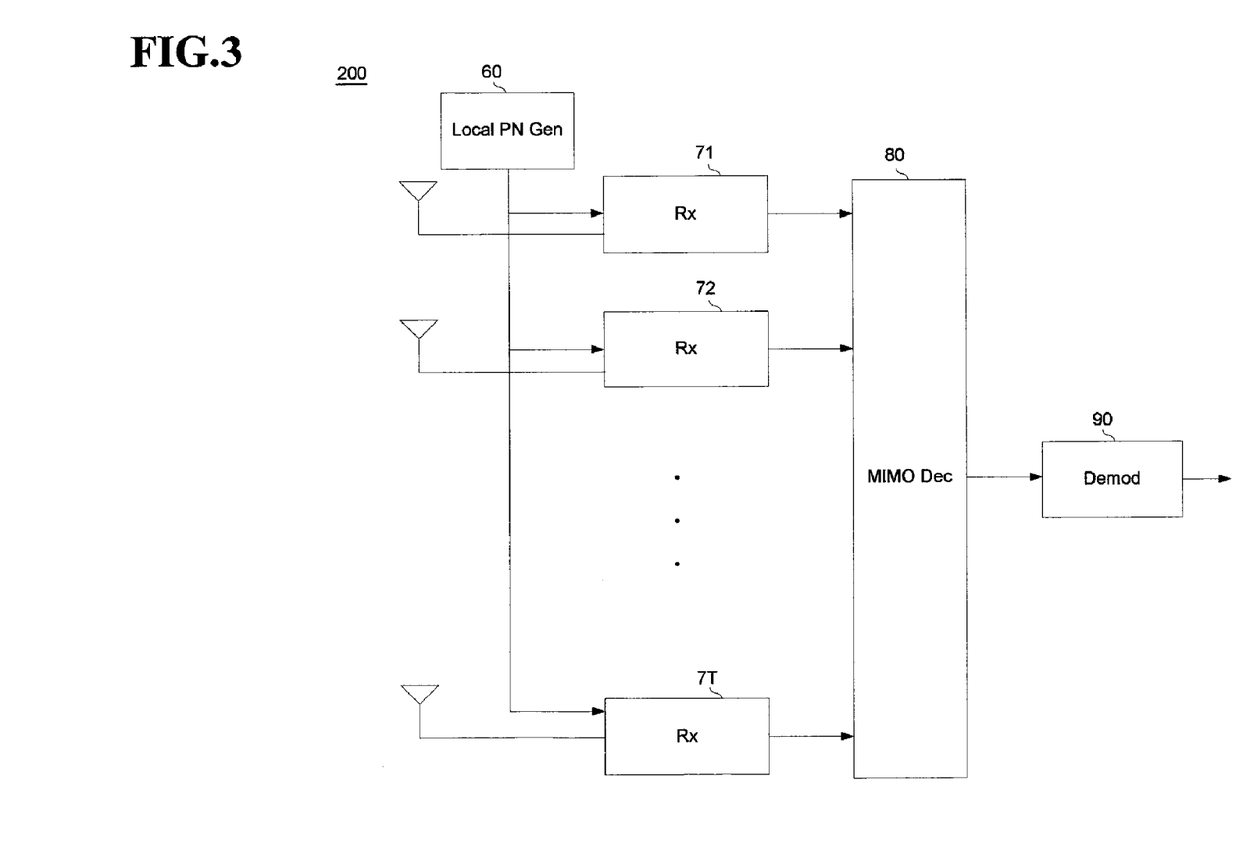
FIG. 3 shows a schematic diagram for a receiving device of an OFDM MIMO according to an embodiment of the present invention.
Figure 4:
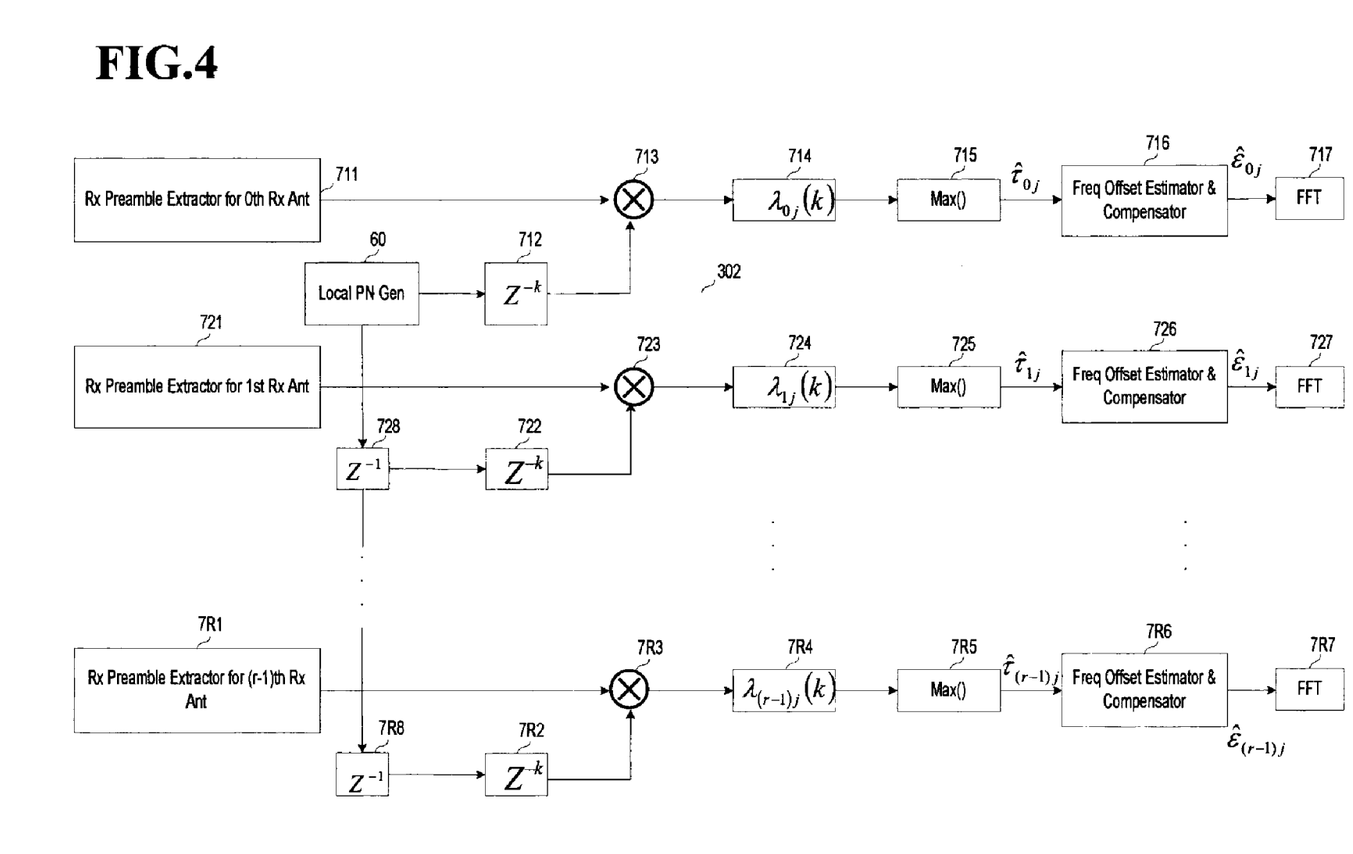
FIG. 4 shows a detailed schematic diagram for the receiving device shown in FIG. 3.

FIG. 3 shows a schematic diagram for a receiving device in a mobile communication system according to an embodiment of the present invention, and FIG. 4 shows a detailed schematic diagram for the receiving device shown in FIG. 3.

As shown in FIG. 3 and FIG. 4, the receiving device 200 includes a local PN generator 60, a MIMO decoder 80, and a demodulator 90, and it further includes preamble extractors (711, 721-7R1), first delay units (712, 722-7R2), multipliers (713, 723-7R3), correlation measurement units (714, 724-7R4), timing error estimator and compensators (715,725-7R5), frequency offset estimator and compensators (716, 726-7R6), and FFT units (717, 727-7R7) as many as the number of receive antennas respectively.

The local PN generator 60 generates a PN sequence for estimating a timing error, and the generated PN sequence represents a duplicate of the PN sequence generated by the transmitting device.

The preamble extractors (711, 721-7R1) extracts preamble symbols from the received signals that are received through the receive antennas and are then converted into the OFDM symbols. In this instance, the OFDM symbols are signals from which the CP is eliminated.

The first delay units (712, 722-7R2) delay the local PN sequence provided by the local PN generator 60 and then output the delayed local PN sequence, and the multipliers (713, 723-7R3) multiply the delayed local PN sequence and the preamble symbol output by the preamble extractors (711, 721-7R1), and then output multiplied signals.

The correlation measurement units (714,724-7R4) generate a correlation value between the local PN sequence and the preamble symbol for generating a timing error based on the signal output by the corresponding multiplier. The timing error estimator and compensators (715, 725-7R5) generate a timing error based on the generated correlation value and accordingly compensates the timing error. The frequency offset estimator and compensators (716, 726-7R6) estimate a frequency error by using the preamble symbol extracted according to a predetermined condition and compensates the same. The FFT units (717, 727-7R7) perform FFT on the timing error and frequency offset compensated OFDM symbol and output a frequency domain signal.

The MIMO decoder 80 decodes the signals output by the respective FFT units (717, 727-7R7) and outputs decoded signals, and the demodulator 90 demodulates the decoded signals.

As shown in FIG. 3 and FIG. 4, a unit for including each one of the preamble extractors (711, 721-7R1), the first delay units (712, 722-7R2), the multipliers (713, 723-7R3), the correlation measurement units (714, 724-7R4), the timing error estimator and compensators (715,725-7R5), the frequency offset estimator and compensators (716, 726-7R6), and the FFT units (717, 727-7R7) will be referred to as a receiver, for ease of description, and hence, the receiving device 200 can be realized to include a plurality of receivers (71-7R) respectively corresponding to the receive antennas, as shown in FIG. 3.

As shown in FIG. 4, in the receiving device 200, the receivers (72-7R) other than the receiver 71 connected to the first receiving antenna further include second delay units (728-7R8) that are provided between the local PN generator 60 and the first delay units (722-7R2), delay the PN sequence applied by the PN generator 60, and transmit the delayed PN sequence to the first delay unit.

In addition, the receiving device 200 may further include a means for estimating a channel, and a means for equalizing the channel based on the channel estimation result. A device for estimating the timing error and the frequency offset according to the embodiment of the present invention can be realized by selectively combining part or all of the components of the above-configured receiving device 200.

An operation by the transmitting device according to an embodiment of the present invention will now be described.

Figure 5:
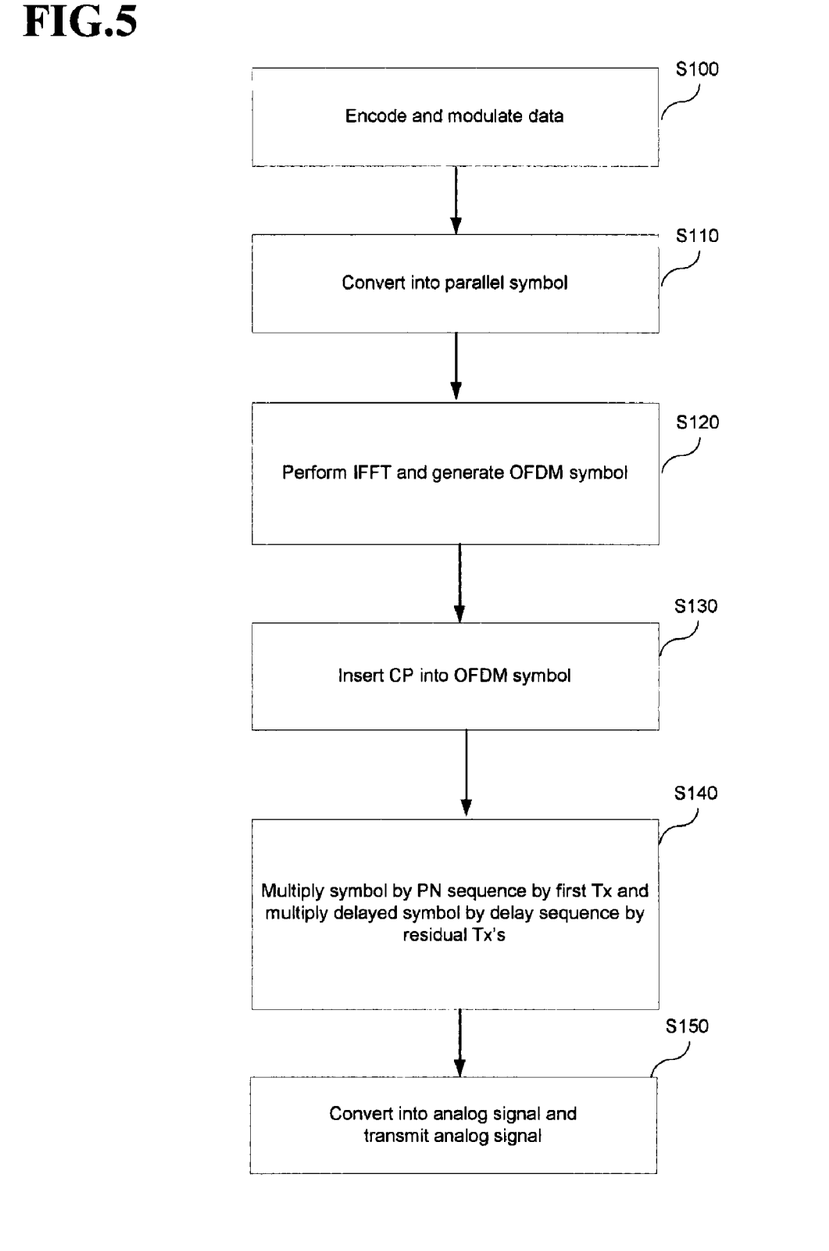
FIG. 5 shows an operational flowchart for a transmitting device according to an embodiment of the present invention.

FIG. 5 shows a flowchart for a transmission process according to an embodiment of the present invention.

As shown in FIG. 5, the data to be transmitted are modulated into predetermined symbols by the modulator 10 (S100). The encoder 20 encodes the modulated symbols and outputs the encoded symbols, and for example, performs encoding by using the convolution coder, turbo coder, and LDPC (low density parity check) coder. The modulated data symbols are respectively input to the respective transmitters (41-4T) as shown in FIG. 2, and in this instance, the data symbols are converted into parallel symbols and are then input to the transmitter.

The data symbols input to the transmitters (41-4T) are processed by the IFFT units (411, 421-4T1) and are output as OFDM symbols that are time domain signals (S110-S120). After the IFFT process, a CP is inserted into a predetermined interval of the data symbol by the CP generators (412,422-4T2) (S130).

The PN generator 30 generates a PN sequence, and the multipliers (413, 423-4T3) multiply the preamble symbol of the CP added OFDM symbol and the PN sequence. Particularly, in order to eliminate the influence caused by the multipath channel in the embodiment of the present invention, the transmitters (42-4T) other than first transmitter delay the preamble symbol of the CP added OFDM symbol through the first delay units (426-4T6), and multiply the delayed preamble symbol by the PN sequence. Particularly, the first delay units (426-4T6) delay the preamble symbol by shifting the same by (N−1)D times samples. The PN sequences generated by the PN generator 30 are respectively delayed by the second delay units (427-4T7) in synchronization with the delay of the preamble symbol caused by the first delay units (426-4T6). Therefore, the multipliers (423-4T3) of the transmitters (42-4T) multiply the delayed preamble symbol and the PN sequence and output result symbols (S140). The output preamble symbols are expressed as given in Equation 7.

The OFDM symbol combined with the PN sequence is converted into an analog signal by the signal converters (414, 424-4T4), the analog signal is processed to be a radio signal by the radio frequency processors (415, 425-4T5), and the radio signal is transmitted to the radio channel (S150).

An operation by the receiving device for receiving the transmitted signal will now be described based on the estimation method according to an embodiment of the present invention.

Figure 6:
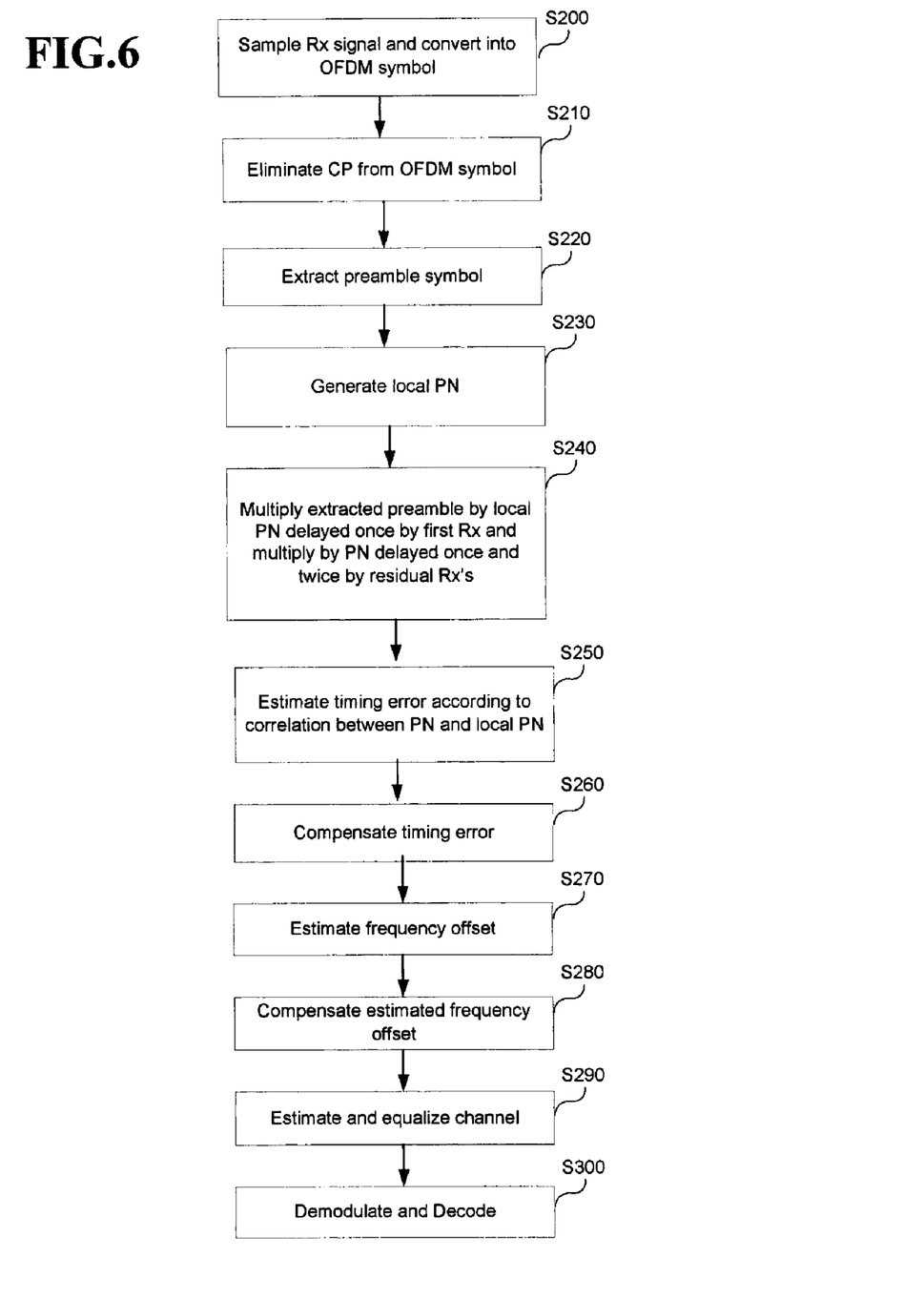
FIG. 6 shows an operational flowchart for a receiving device for estimating a frequency offset and a timing error according to an embodiment of the present invention.

FIG. 6 shows a flowchart for a receiving process according to an embodiment of the present invention.

The receiving device 200 receives the signal that is processed as described above, and the received signal is expressed in Equation 8. The received signal is sampled, the sample signal is converted into a digital OFDM symbol, and the OFDM symbol is process as follows.

As shown in FIG. 6, the receivers (preamble extractors (711, 721-7R2 of 71-7R) of the receiving device 300 eliminate the CP from the received OFDM symbol, and extracts the preamble symbol from the OFDM symbol so as to estimate the timing error and the frequency offset (S200-S220).

To estimate the timing error, the local PN generator 60 generates a local PN sequence that is a duplicate of the PN sequence generated by the transmitting device (S230), and subsequently multiplies the local PN sequence by the preamble symbol. In detail, the multiplier 713 of the first receiver 71 delays the local PN sequence through the first delay unit 712 and multiplies the delayed local PN sequence by the preamble symbol applied by the preamble extractor 711. The multipliers (723-7R3) of the receivers (72-7R) other than first receiver multiply the local PN sequence that is delayed by the second delay units (728-7R8) and is then additionally delayed by the first delay units (722-7R2) by the preamble symbol (S240).

The PN sequences delayed (i.e., shifted) for synchronization with the transmission side are multiplied with the preamble symbol, and the correlation measurement units (714, 714-7R4) generates the correlation value between the corresponding transmit antenna and the receive antenna. That is, the correlation value between the PN sequence and the local PN sequence is acquired.

The timing error estimator and compensators (715, 725-7R5) estimates the timing error between the receive antenna and the receive antenna based on the correlation value (S250), and estimates the maximum value of the amplitude $\lambda(i)$ of the signal generated according to Equation 11 to be a timing error. The timing error estimator and compensators (715, 725-7R5) compensates the OFDM symbol based on the estimated timing error (S260).

After the timing error compensation, the frequency offset estimator and compensators (716, 726-7R6) estimates the frequency offset based on Equation 12 and Equation 13, and compensate the estimated frequency offset (S270-S280). The OFDM signal received after the timing error and frequency offset compensation is converted into a frequency domain signal by the FFT units (717, 727-7R7).

The MIMO decoder 80 decodes the frequency domain signal processed and output by the receivers (71-7R), and the demodulator 90 demodulates the signal according to a specific modulation method, such as 64 QAM, 16 QAM, and QPSK, used to modulate the subcarriers by the transmitting device 100. That is, the transmitting device 100 demodulates the signal according to a predetermined modulation order (e.g., 64 QAM, 16 QAM, QPSK) used to modulate the subcarriers.

A test is performed to estimate performance of the estimating device for estimating the timing error and the frequency offset in the mobile communication system according to an embodiment of the present invention.

Figure 7:
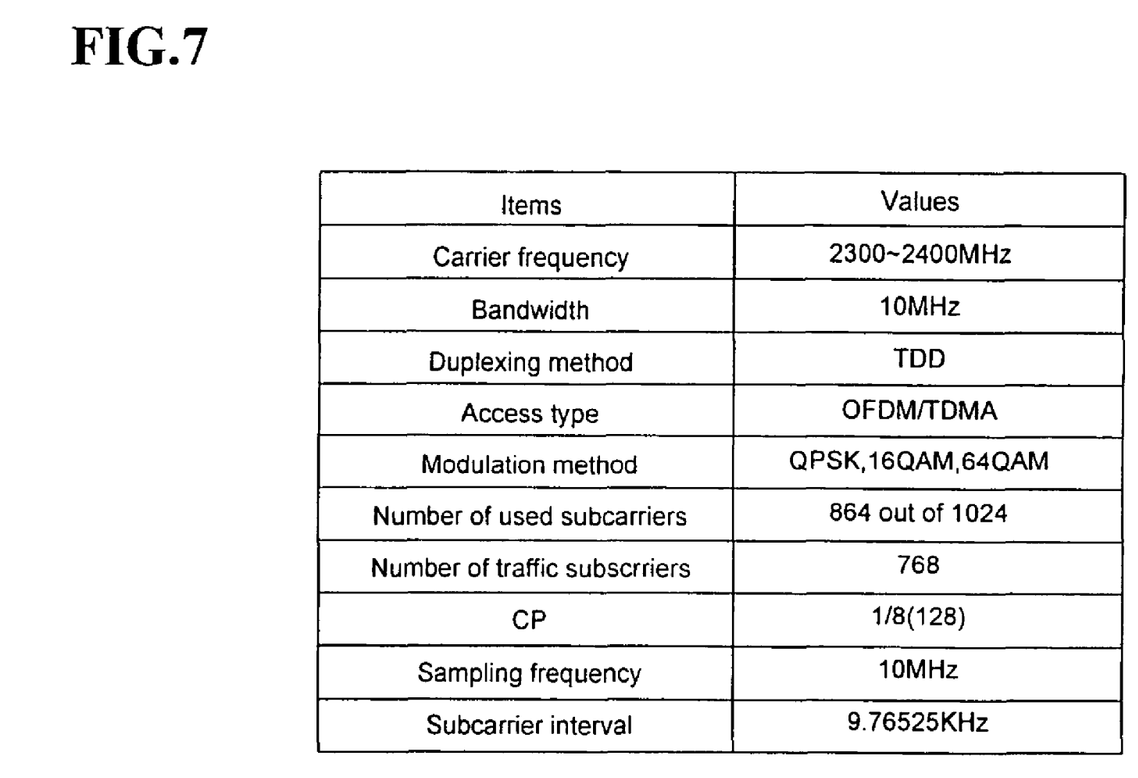
FIG. 7 shows default OFDM parameters for simulation according to an embodiment of the present invention.

Performance of the method for estimating the timing error and frequency offset based on the synchronization algorithm according to an embodiment of the present invention can be proven through a simulation. The simulation condition is the 4×4 MIMO OFDM system using four transmit antennas and four receive antennas. FIG. 7 shows OFDM parameters for simulation according to an embodiment of the present invention.

The complex PN sequence is given as $P_I(x)=x^{15}+x^{13}+x^9+X^8+x^7+x^5+1$ and $P_Q(x)=x^{15}+x^{12}+x^{11}+x^{10}+x^6+x^5+x^4+x^3+1$. The first OFDM symbol is considered as a preamble symbol where A=1, K=8, and M=128, G=144.

Figure 8:
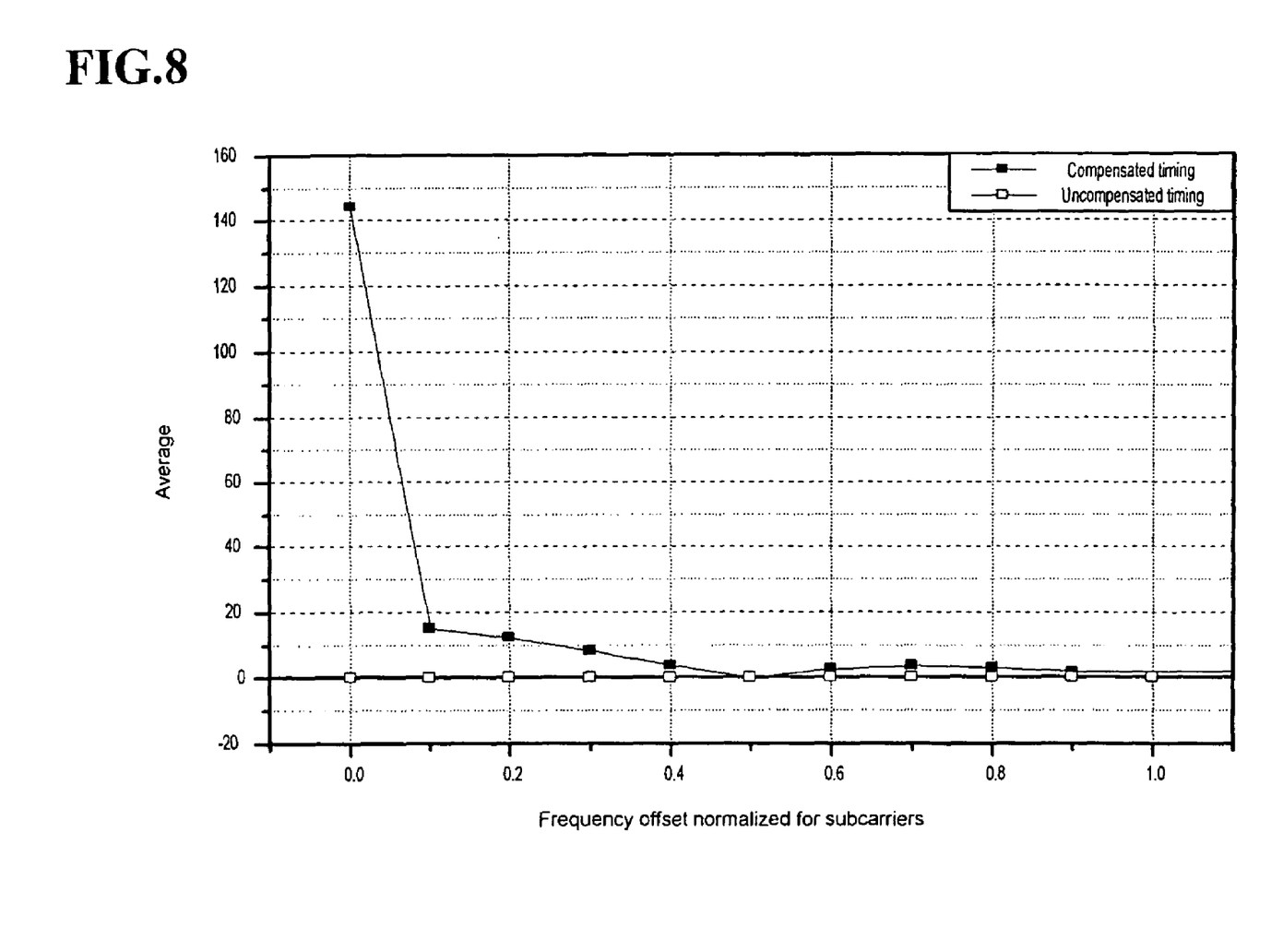
FIG. 8 shows a graph for indicating averages of estimated timing errors according to an embodiment of the present invention.

FIG. 8 shows timing error estimation performance averages of the estimating device according to an embodiment of the present invention. Referring to FIG. 8, it is known that the influence by the frequency offset is very heavy and the average can be 0 at a predetermined frequency offset value. Referring to FIG. 8, the average of the timing error corrected estimating device according to an embodiment of the present invention is generally high, and the timing error is accurately estimated. When the timing error is not corrected, the average of the signal is 0. The estimating device according to an embodiment of the present invention can efficiently estimate the frequency offset since it has a high average.

Figure 9:
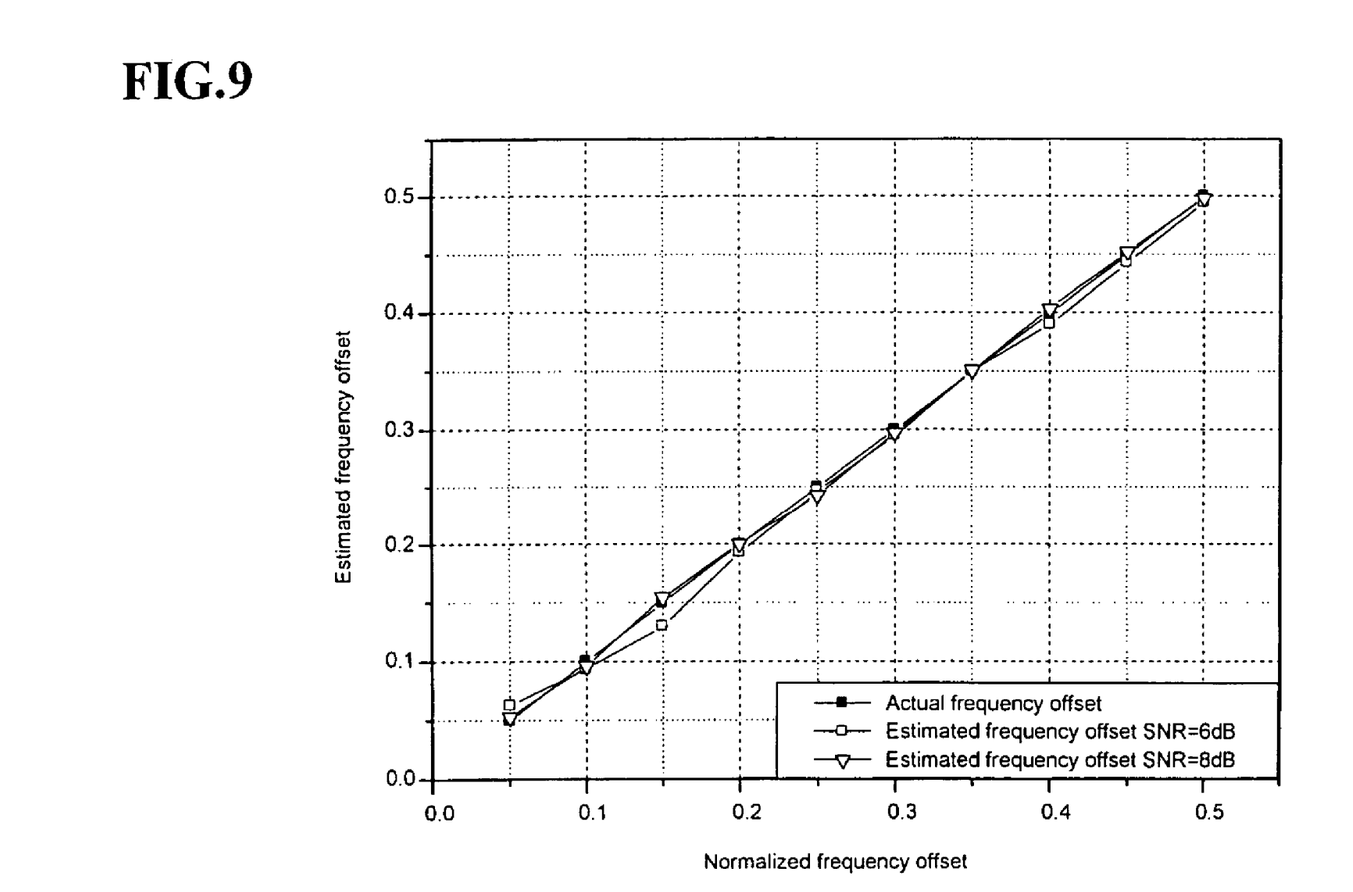
FIG. 9 shows a graph for indicating frequency offset estimation performance according to an embodiment of the present invention.

FIG. 9 shows a graph for frequency offset estimation performance by an estimating device according to an embodiment of the present invention. The moving speed of user equipment used for simulation is 60 km/h. In this instance, the estimated frequency offset SNRs are 6 dB and 8 dB, and referring to FIG. 9, it is known that the difference between the estimated frequency offset and the actual frequency offset is very little. Therefore, the estimating device according to an embodiment of the present invention acquires high frequency offset performance on the multipath channel.

Figure 10:
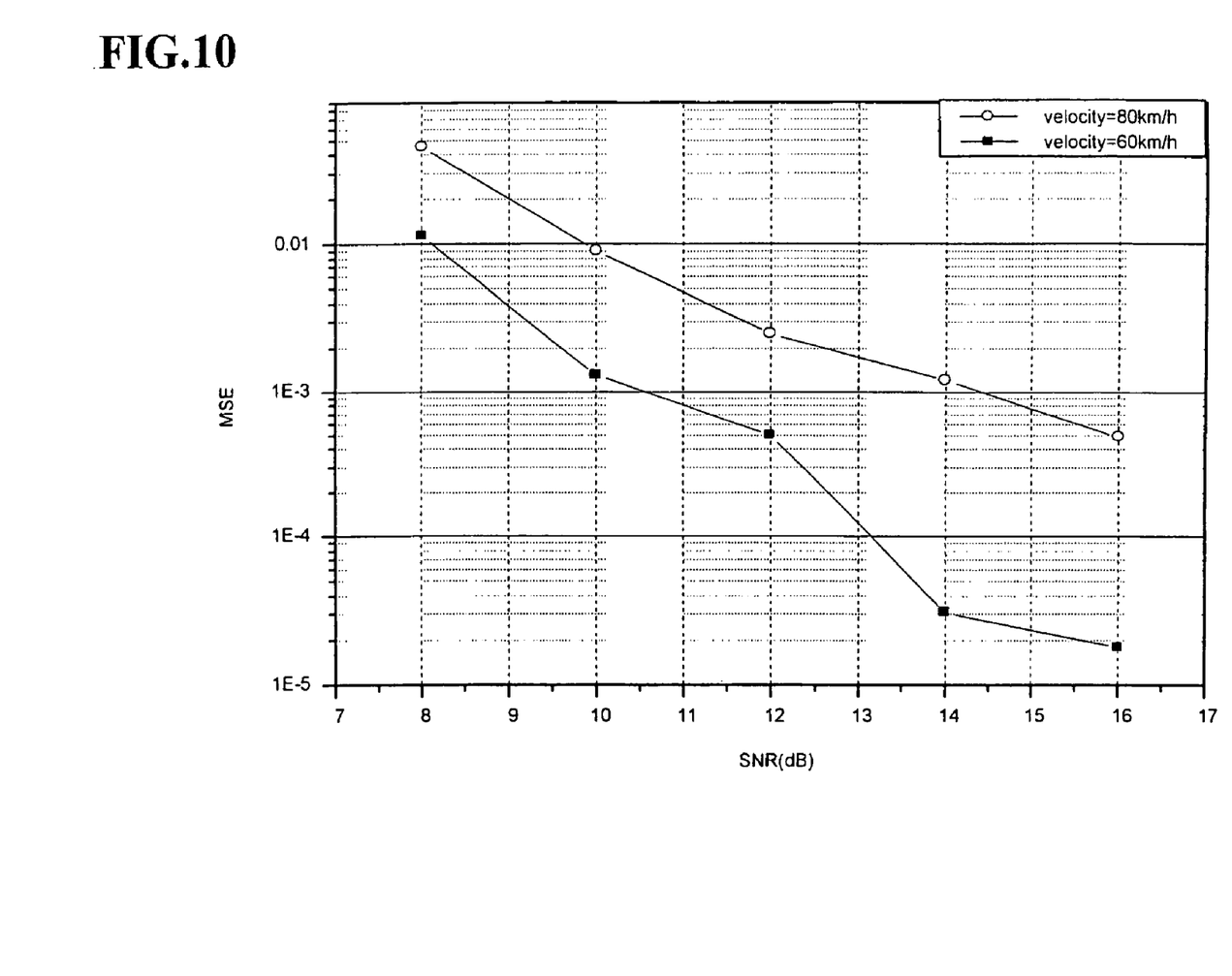
FIG. 10 shows a MSE (Minimum Square Error) of frequency offset estimation for SNRs according to an embodiment of the present invention.

FIG. 10 shows a MSE (Minimum Square Error) graph for frequency offset estimation according to an embodiment of the present invention, showing the MSEs of estimated frequency offsets for user equipment having the moving speed of 60 km/h and user equipment having the moving speed of 80 km/h. Referring to FIG. 10, the MSEs of the estimated frequency offsets having different SNRs are known.

Figure 11:
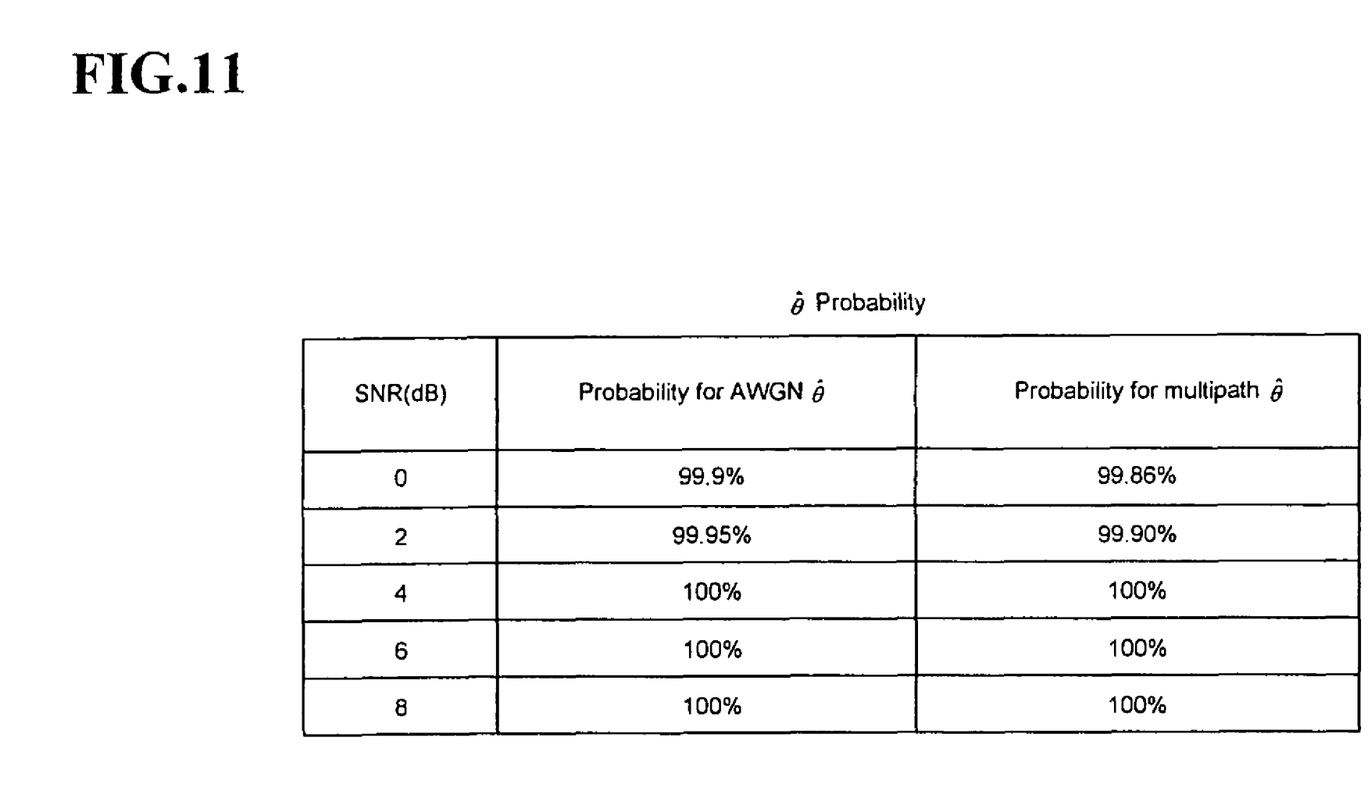
FIG. 11 shows probability for timing errors according to an embodiment of the present invention.

FIG. 11 shows a table for showing the probability of timing error according to an embodiment of the present invention. In this instance, the timing error is given as $\hat{\theta}$, and in detail, it indicates the probability of $\hat{\theta}$ on the AWGN (added white Gaussian noise) channel and the multipath channel. Referring to FIG. 11, the parameters (e.g., timing errors) can be accurately estimated by the estimating device when the SNR is operable, because the PN has a widely distributed gain P=2048/16. Therefore, the estimating device performance is substantially improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the embodiment of the present invention, the timing error and the frequency offset are accurately estimated when the OFDM MIMO system receives the signal from the transmitting device and processes the same. Therefore, the parameters according to estimation are accurately selected so that the ISI and ICI according to the multipath channel are efficiently reduced. As a result, time-frequency synchronization is efficiently performed.

What is claimed is:

1. A method for estimating a timing error and a frequency offset based on a received signal in an OFDM MIMO system, the method comprising:

a) processing signals received through a plurality of antennas to generate OFDM symbols, and extracting a preamble symbol from the OFDM symbol wherein a PN sequence is multiplied to the preamble symbol of the OFDM symbol and the OFDM symbol and the PN sequence are multiplied with each other after a predetermined delay at a transmitting side;

b) generating a local PN sequence which corresponds to the PN sequence, delaying the local PN sequence for a predetermined value and multiplying the extracted preamble symbol by the local PN sequence;

c) estimating a timing error based on the amplitude of a corresponding signal that is generated by multiplying the extracted preamble symbol by the local PN sequence, and compensating the timing error; and d) estimating a frequency offset based on the preamble symbol to which the local PN sequence is multiplied, and compensating the frequency offset.

2. The method of claim 1, wherein the local PN sequence delayed by a first value is multiplied to the preamble symbol extracted from the signal received through a first antenna from among the antennas, and the local PN sequence delayed by a first value and a second value is multiplied to the preamble symbol extracted from the signals received through antennas other than the first antenna.

3. The method of claim 2, wherein a PN sequence delayed for a predetermined value at the transmitting side is multiplied to the preamble symbol of the OFDM symbol included in the signals received through the antennas other than the first antenna.

4. The method of any one of claim 1 to claim 3, wherein in c), the maximum value of the amplitude $\lambda(i)$ for the corresponding signal generated by multiplying the extracted preamble symbol by the local PN sequence is estimated to be a timing error.

5. The method of any one of claim 1 to claim 3, further comprising:

the transmitting side inserting a predetermined preamble symbol to the signal to be transmitted wherein a remaining value among two nonzero values of the preamble sequence corresponding to the preamble symbol is zero;

performing IFFT on the signal to which the predetermined preamble symbol is inserted, and after the IFFT performance, varying an interval between two nonzero values of the preamble sequence according to an interval between a length of a subcarrier in an OFDM symbol and the nonzero value of the preamble sequence before the IFFT performance;

adding a CP (cyclic prefix) to the IFFT performed signal; and multiplying the predetermined preamble symbol of the CP added signal by the PN sequence.

6. The method of claim 5, wherein a CP delayed by a predetermined value is added to the IFFT performed signals to be transmitted through antennas other than the first transmit antenna, and a PN sequence delayed by a predetermined value is multiplied to predetermined preamble symbols of the signals to which the CP delayed by the predetermined value is added.

7. The method of any one of claim 1 to claim 3, further comprising eliminating ICI (Inter Carrier Interference) and ISI (inter-symbol-interference) based on the parameters including the maximum delay $\tau_{max}$ of a multipath channel, a symbol rate ($U \approx \lceil \tau R \rceil$), and an interval of two nonzero values of the preamble sequence.

8. A device for estimating a timing error and a frequency offset based on a received signal in an OFDM MIMO system for transmitting and receiving the signal through a plurality of transmit antennas and a plurality of receive antennas, the device comprising:

a plurality of preamble extractors, formed to correspond to a receive antenna, for extracting a preamble symbol from an OFDM symbol for the signal received through the corresponding receive antenna wherein a PN sequence delayed by a predetermined value is multiplied to the preamble symbol of the OFDM symbols of the signals received through a first antenna from among receive antennas;

a local PN generator for generating a local PN sequence that corresponds to the PN sequence and is shifted by a predetermined value;

a multiplier, formed to correspond to a preamble extractor, for delaying the local PN sequence by a predetermined value and transmitting the delayed local PN sequence to the extracted preamble symbol;

a timing error estimator and compensator for estimating and compensating a timing error based on the correlation of the PN sequence of the preamble symbol and the local PN sequence; and a frequency offset estimator and compensator for estimating and compensating a frequency offset based on the preamble symbol to which the local PN sequence is multiplied.

9. The device of claim 8, wherein the multipliers respectively corresponding to the preamble extractors corresponding to the receive antennas other than a first receive antenna from among a plurality of receive antennas delay the local PN sequence according to a first value and a second value, and multiply the delayed local PN sequence by the extracted preamble symbol.

10. The device of claim 8, wherein the timing error estimator and compensator $\lambda(i)$ estimates the maximum value of the amplitude of the signal multiplied to the preamble from which the local PN sequence is extracted.

* * * * *